United States Patent [19]
Zardi et al.

[11] Patent Number: 5,006,316
[45] Date of Patent: Apr. 9, 1991

[54] REACTORS FOR HETEROGENEOUS SYNTHESIS

[75] Inventors: Umberto Zardi, Breganzona; Giorgio Pagani, Lugano, both of Switzerland

[73] Assignee: Ammonia Casale S.A., Switzerland

[21] Appl. No.: 194,402

[22] Filed: May 16, 1988

[30] Foreign Application Priority Data

May 14, 1987 [CH] Switzerland .................. 01846/87

[51] Int. Cl.$^5$ ............................................. B01J 8/04
[52] U.S. Cl. ..................... 422/148; 422/192; 422/198; 422/239; 423/361
[58] Field of Search ............ 422/148, 192, 239, 198; 423/361

[56] References Cited

U.S. PATENT DOCUMENTS 4,341,737  7/1982  Albano et al. ............... 422/148
4,755,362  7/1988  Zardi ........................... 422/148

Primary Examiner—Robert J. Warden
Assistant Examiner—Jill Johnston
Attorney, Agent, or Firm—Ostrolenk, Faber, Gerb & Soffen

[57] ABSTRACT

In reactors for heterogeneous synthesis, comprising a boiler and a heat exchanger inserted at least partially into the end catalytic beds, and at least an intermediate catalytic bed, two airspaces are now provided in each catalytic bed by introducing couples of annular walls, one of said airspaces being produced between the cartridge's internal wall and the perforated wall inserted close to it.

5 Claims, 2 Drawing Sheets

REACTORS FOR HETEROGENEOUS SYNTHESIS

BACKGROUND OF THE INVENTION

1. Field of the Invention

This invention concerns the improvements made to reactors for heterogeneous synthesis. It concerns more particularly a system to increase the yields of reactors for heterogeneous synthesis and more particularly for the synthesis of ammonia, comprising a catalytic layer partly connected to a boiler, a catalytic layer substantially run through by a heat exchanger, and at least one intermediate catalytic layer.

2. Description of the Related Art

Reactors of the type described above are known per se and are the object of Italian patent No. 28961-66.

In order to establish matters straight away and to make it as easy as possible to understand the invention, FIG. 1 (partial cross-section with a plan showing the reactor's axis) outlines a reactor design according to the patent in question.

The synthesis gas GS enters from 10, flows from top to bottom through airspace 21 between the internal wall 22 of the shell M and the external wall 23 of the cartridge CU, flows upwards from the bottom F0 (following arrow F1) running through the inside of tubes Ti of the heat exchanger SC, flows axially (arrow F2) through the intermediate catalytic layer CC, is cooled in the first branch of the boiler CA from the top of which it leaves in order to penetrate (arrow F3) the top catalytic layer CS, through which it runs axially from top to bottom leaving according to arrow F4 and flowing again upwards as F'4 which enters tube BP which takes it as flow F5 directly into the lower catalytic layer CI from which it flows as F'5 to continue upwards inside exchanger SC from the top of which it is sent downwards as F7 flowing through central tube 25' and leaving this as reacted gas F'7.

Arrow F8 indicates the conduction of water to the boiler and arrow F9 indicates the exit from the boiler of the vapour produced therein by recovering reaction heat. Since the reactor in question is known it is not described in detail herein, such description being available in the abovementioned Italian patent No. 28961-66 which is deemed to be incorporated herein.

Reactors of the type described above, although already remarkably improved when compared to the technology available up to the moment when they made their appearance, suffered from a number of disadvantages which in the long run became an obstacle to the success which it seemed reasonable to expect from them.

Among the disadvantages in question, mention should be made in particular of those connected with the axial flow of the synthesis gas through the catalytic beds, of the ensuing pressure drops and of the need to use a large size catalyst in order to limit the pressure drop in question.

SUMMARY OF THE INVENTION

The purpose of this invention is now a system to eliminate the above-mentioned disadvantages and to supply a reactor of the type described above but modernized so that the gas flows axially through a minimal fraction of the catalytic beds, and flows radially through the major portion of said catalyst.

These and other purposes are achieved by means of a system characterized by the fact that in each catalytic bed two airspaces are provided by introducing annular walls at least partially perforated for all the length of the corresponding bed, one of these airspaces being formed by the cartridge's internal wall and the perforated wall close to it.

In a preferred embodiment, in the end catalytic beds, the top one connected to the boiler and the bottom one connected to the exchanger, the external annular wall forming an airspace with the internal wall of the cartridge is perforated for the totality of its length, and the internal walls which form an airspace with the boiler's external wall, and correspondingly the heat exchanger's external wall, have a shorter length of perforations than the said external wall totally perforated and facing the cartridge.

According to an aspect of the invention the minor part of the internal length which is unperforated consists of portions of the boiler's solid walls, and correspondingly of the heat exchanger's. The system according to claim 1 is characterized by the fact that in the intermediate catalytic layers unconnected to the boiler or to the heat exchanger, the annular wall forming an airspace with the cartridge is the external one and is perforated along a shorter length than the annular internal wall, the cylindrical space inside said annular wall with the greater perforated length being free from catalyst, constituting the second airspace.

The invention obviously comprises the reactors as obtained with the system in question.

BRIEF DESCRIPTION OF THE DRAWINGS

Other features and advantages of the present invention will become apparent when the following description is read in conjunction with the accompanying drawings, in which.

DETAILED DESCRIPTION OF THE PREFERRED EMBODIMENTS

Figure 1:
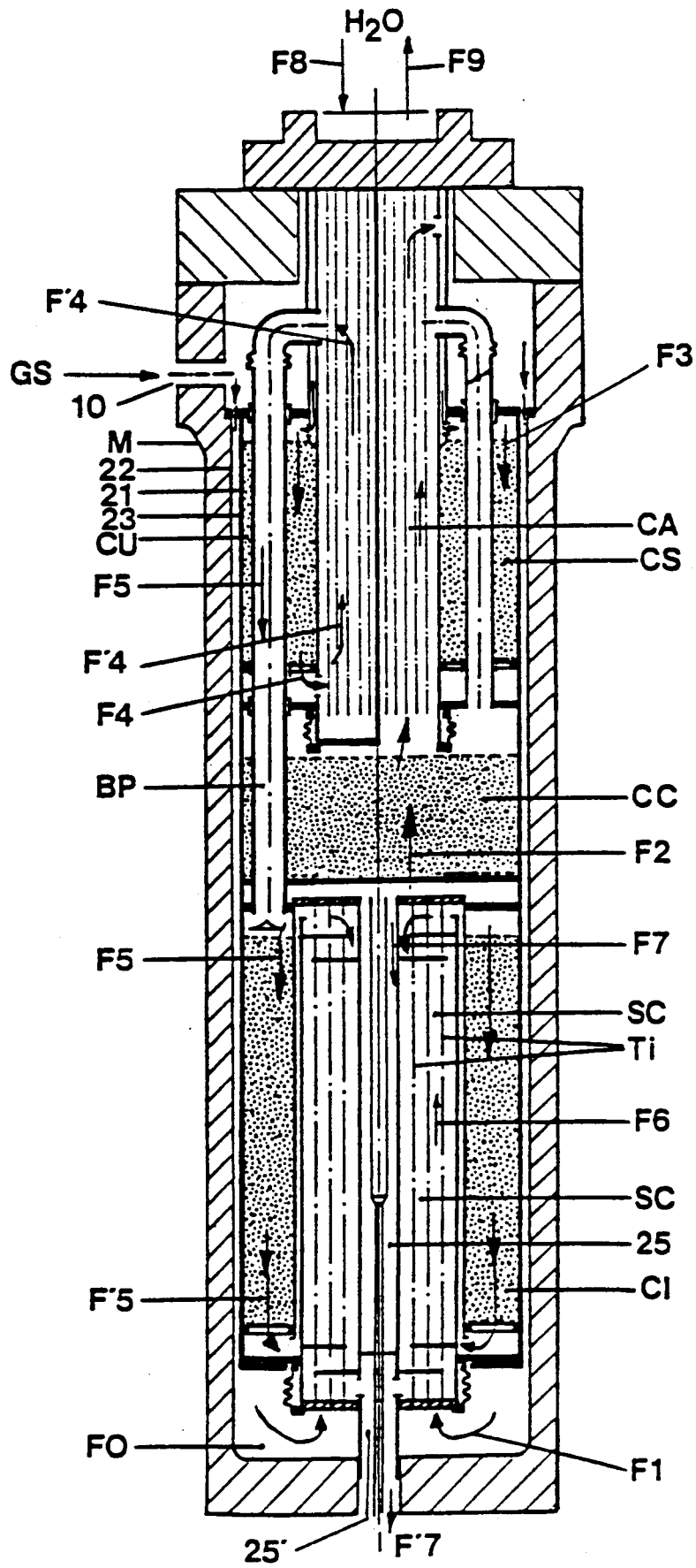
FIG. 1 shows a cross-sectional view of a known reactor.
Figure 2:
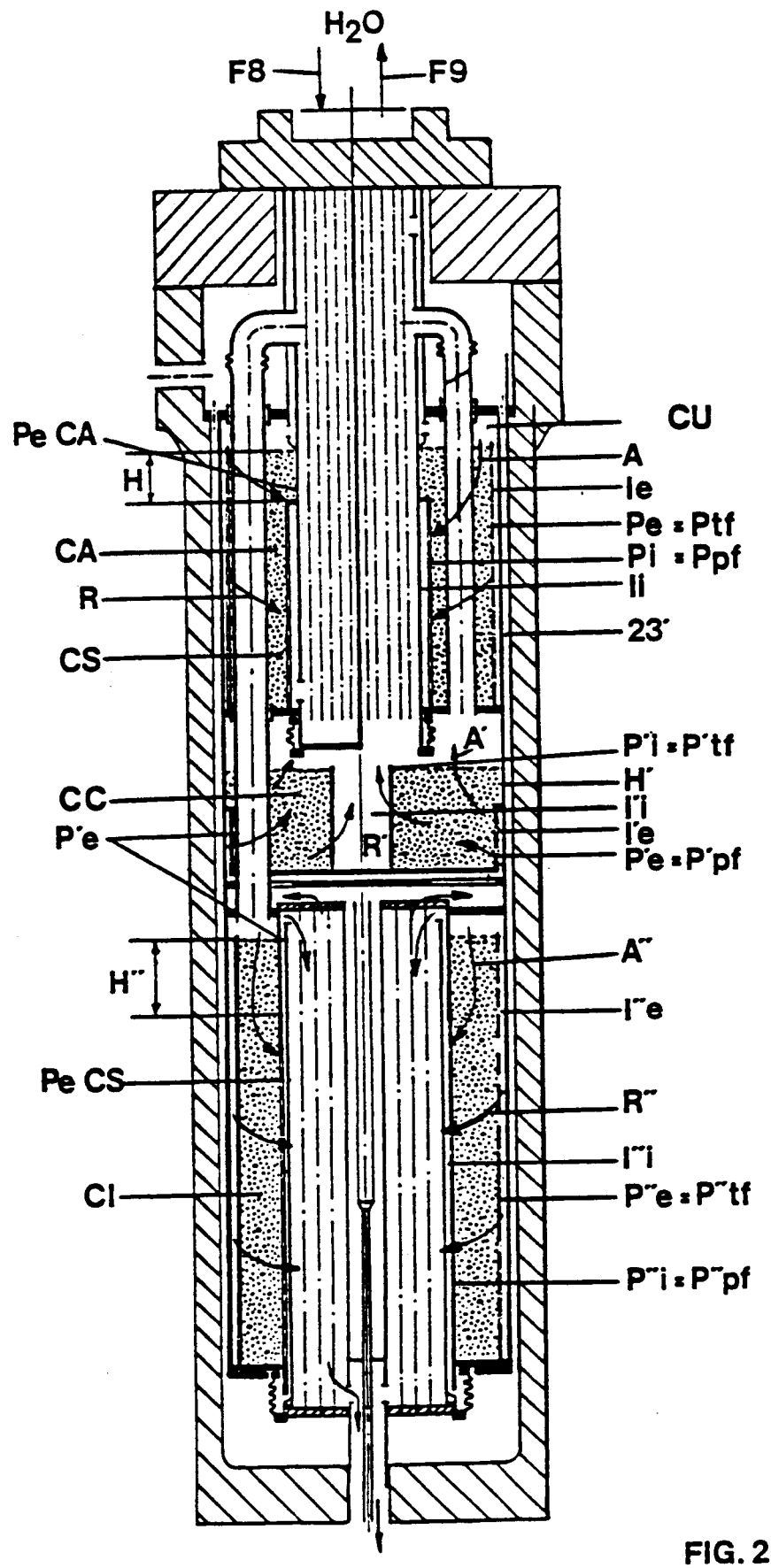
FIG. 2 shows a cross-sectional view of a reactor in accordance with the invention.

A preferred but not limitative embodiment of the invention is shown in FIG. 2, which is a longitudinal partial cross-section, similar to that in FIG. 1, of a reactor converted from being totally axial to being substantially radial.

According to a first aspect of the invention, two airspaces are created in each catalytic bed, one of these, i.e. still the external one Ie, I'e, I"e, always involves the internal wall 23' of the cartridge CU. In effect the annular external walls Pe, P'e, P"e are introduced into the three beds to form said external airspaces Ie, I'e, I"e with 23'. Into the same beds are introduced annular internal walls Pi, P'i, P"i which form the internal airspaces Ii, I'i, I"i.

According to an aspect of the invention, in the two end beds connected to the boiler (top bed CS) and to the heat exchanger (bottom bed CI), the external walls Pe and P"e are totally perforated so that Pe=Ptf and P"e=P"tf (where Ptf stands for totally perforated wall). The corresponding internal walls Pi and P"i are unperforated for a minor portion H, respectively H". Preferably the unperforated section H consists of the boiler's external wall Pe CA. In the bottom bed CI too the unperforated wall H" can be the external wall Pe CS of the heat exchanger.

Preferably, however, the section H" is the unperforated continuation of internal wall Pi" which coincides therefore with the partly perforated wall P"pf (pf=partly perforated).

According to another aspect of the invention, an external annular wall P'e unperforated along section H' is introduced into the intermediate bed, said section H' being formed by the solid wall 23' of the cartridge. The internal annular wall P'i is perforated for its total length, therefore P'i=P'tf. The cylindrical wall inside P'i, i.e. the internal airspace I'i, is now empty, i.e. not filled with catalyst.

By arranging in each bed a totally perforated wall accompanied by a partially perforated wall the axial flow A, A', can be achieved, respectively A" in the minor unperforated portions H, H', respectively H", and a radial flow in the remaining major perforated portions in the single beds.

Thanks to this it is now possible to use a small-size catalyst thus reducing further pressure drop and increasing yields.

The applicants have in effect already described in a series of preceding patents and patent applications the advanced technology of their axial-radial reactors; see in particular U.S. Pat. No. 4,372,920 and European patent application No. 202.454.

Although the present invention has been described in connection with a preferred embodiment thereof, many other variations and modifications will now become apparent to those skilled in the art without departing from the scope of the invention. It is preferred therefore, that the present invention not be limited by the specific disclosure herein, but only by the appended claims.

We claim:

1. A system to increase reactor yield of a reactor for heterogeneous synthesis which includes an internal boiler and an internal heat exchanger inserted at least partially into a catalytic layer comprising:
   a first catalytic layer, the first catalytic layer being partly connected to a boiler;
   a second catalytic layer, the second catalytic layer being party connected to a heat exchanger;
   at least one intermediate catalytic layer disposed between the first catalytic layer and the second catalytic layer;
   each catalytic layer having an internal annular wall and an external annular wall for defining a first airspace and a second airspace for each catalytic layer, the internal annular wall and external annular wall of each catalyst layer being at least partially perforated;
   the external annular wall of the first catalytic layer being perforated along an entire length thereof, the first airspace of the first catalytic layer being defined by the perforated external annular wall of the first catalytic layer and a cartridge wall of the reactor;
   the internal annular wall of the first catalytic layer being perforated along a length less than the length of the external annular wall of the first catalytic layer, the second airspace of the first catalytic layer being defined by the perforated internal annular wall of the first catalytic layer and a wall of the boiler;
   the external annular wall of the second catalytic layer being perforated along an entire length thereof, the first airspace of the second catalytic layer being defined by the perforated external annular wall of the second catalytic layer and the cartridge wall of the reactor;
   the internal annular wall of the second catalytic layer being perforated along a length less than the length of the external annular wall of the second catalytic layer, the second airspace of the second catalytic layer being defined by the perforated internal annular wall of the second catalyst layer and a wall of the heat exchanger.

2. The system of claim 1, wherein a minor unperforated portion of the internal annular wall of the first catalytic layer comprises a portion of the wall of the boiler.

3. The system of claim 1, wherein a minor unperforated portion of the internal annular wall of the second catalytic layer comprises a portion of the wall of the heat exchanger.

4. The system of claim 1, wherein the internal annular wall of the at least one intermediate catalytic layer is perforated along an entire length thereof, the first airspace of the at least one intermediate catalytic layer being defined by the internal annular wall of the at least one intermediate catalytic layer, the external annular wall of the at least one intermediate catalytic layer being perforated along a length less than the internal annular wall of the at least one intermediate catalytic layer, the second airspace of the at least one intermediate catalytic layer being defined by the perforated external wall of the at least one intermediate catalytic layer and the cartridge wall of the reactor.

5. The system according to claim 1, wherein gas flows through the first catalytic layer, the second catalytic layer and the at least one intermediate catalytic layer in an axial-radial flow pattern.

* * * * *